(12) United States Patent
Levine et al.

(10) Patent No.: US 9,375,879 B2
(45) Date of Patent: Jun. 28, 2016

(54) MEDIA IDENTIFICATION PROCESSES

(71) Applicant: Xerox Corporation, Norwalk, CT (US)

(72) Inventors: Jonathan D Levine, Rochester, NY (US); Donald M Pangrazio, III, LeRoy, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/076,184

(22) Filed: Nov. 9, 2013

(65) Prior Publication Data

US 2015/0132491 A1    May 14, 2015

(51) Int. Cl.
    *B05D 5/00*     (2006.01)
    *B05D 5/10*     (2006.01)
    *B29C 67/00*    (2006.01)
    *B29L 7/00*     (2006.01)

(52) U.S. Cl.
    CPC ....... *B29C 67/0051* (2013.01); *B29L 2007/004* (2013.01)

(58) Field of Classification Search
    CPC ............... B29C 67/0051; B29L 2007/004; B32B 7/12; B32B 2250/05
    USPC ............................................. 427/207.1, 208.8
    See application file for complete search history.

(56) References Cited

U.S. PATENT DOCUMENTS

2001/0030020 A1* 10/2001 Nandy ................... B31D 1/021
                                                    156/289
2014/0356592 A1* 12/2014 Colella ................. B44C 1/1712
                                                    428/201

* cited by examiner

*Primary Examiner* — Xiao Zhao
(74) *Attorney, Agent, or Firm* — Eugene O. Palazzo

(57) ABSTRACT

A process for the preparation of identifying media, such as a label or decal, that includes the deposition of suitable layers, and where each of the layers can be individually and sequentially formed with a three dimensional printing apparatus in communication with a computer assist device.

23 Claims, 3 Drawing Sheets

MEDIA IDENTIFICATION PROCESSES

This disclosure is generally directed to processes for the preparation of identification media comprising the utilization of three dimensional printing technologies (3-D), inclusive of three dimensional printing devices.

BACKGROUND

A number of processes and devices are known for the preparation of labels, decals, and identification tags. Thus, labels can be generated in various sizes and shapes including, for example, a wrap-around label, in which a leading edge of the label is initially secured with an adhesive to a three dimensional object, such as a container, other product or product packaging of any shape, and where the label or decal is, for example, one in which both the leading and trailing edges of the label or decal are affixed directly to the object. The securement of labels and decals to certain surfaces should be of such a quality that the labels and decals can withstand various adverse conditions, such as those that take place with transportation, weather, handling, and where the labels and decals retain their printed messages with colors that are substantially free of being diluted or smeared. For example, with bottles of carbonated beverages, the labels and decals should withstand expansion of the bottles due to the carbonation of the beverage, and additional expansion and contraction during shipping and storage operations in which the temperatures of the bottle may vary. Moreover, labels and decals should also be aesthetically pleasing, and where the exposed edge of a label or decal should not readily flap, become detached from the product, have exposed adhesive, or have large amounts of adhesive forming lumps underneath the label.

Known labels and decals can include two or more layers of, for example, a print substrate, to which a self-adhesive coating has been applied, and a backing material, and where the backing material may contain a release layer. The function of the backing material is to transport the label during its fabrication and to protect the adhesive layer from becoming contaminated, so that it can properly pass through the processing operations of printing, punching, cutting, and perforating.

Self-adhesive labels and decals are used in a very wide variety of applications, and where they satisfy a broad spectrum of differing requirements. In addition, labels, decals and other identification media can be costly to prepare, require complex equipment, and are susceptible to producing products that are not satisfactory, especially for extended time periods.

Disadvantages associated with the preparation of labels, decals, and identification tags with various known devices and processes include that a plurality of steps are needed, such as form cutting and kiss cutting where the stock material selected is usually not completely cut, a separate device or machine is usually required to properly apply and spread the adhesive layer, a separate device or machine is usually needed to print text or graphics, when the backing material and the face material are different, then the manufacturing process involves added steps and the order of the deposited layers may not be readily changed. Additionally, many known devices and processes for the preparation of labels and decals are costly. Furthermore, the use of a multitude of devices to prepare labels and decals can result in at least one of the devices becoming inoperative thus adding costs and time to the processes.

There is a need for labels, decals, identification tags and other media processes that substantially avoid or minimize the disadvantages of a number of known processes and devices.

Further, there is a need for processes and devices where labels, decals, and identification tags can be economically prepared.

Also, there is a need for label and decal simple reproducible processes where there can be simultaneously obtained excellent black, white and color text, graphics, or a mixture of color text and graphics.

Moreover, there is a need for effective economical direct processes for the generation of labels, decals, and other identification media.

Yet another need resides in providing labels, decals, and other identification media where there is a reduction in the number of process manufacturing steps.

Another need relates to providing labels, decals, and other identification media where the layers thereof are continuously deposited for extended time periods, and where the positions of each of the layers can be controlled and changed.

Yet there is a need for the direct and simple preparation of labels, decals, and other identification media with excellent permanent text and graphic images thereon, and with excellent resolution that is readily readable by consumers.

Further, there is a need for labels, decals, and other identification media devices and processes where the layers thereof can be applied continuously and without interruption, that is for example, where a second device is avoided for the deposition of a layer, such as an adhesive layer.

Additionally, there is a need for devices and processes where there can be economically obtained labels, decals, and other identification media with no image or identification errors.

It is yet another need to prepare labels, decals, and other identification media where there is flexibility in the manufacturing process, that is for example, there is the capability to produce dissimilar textures or relief characteristics without retooling, and by reducing the number of steps usually followed.

These and other needs are achievable in embodiments with the devices and processes thereof disclosed herein.

SUMMARY

Disclosed is a process for the preparation of identifying media comprising the generation of a backing layer, an adhesive layer in contact with the backing layer, a face stock layer, a layer of text, graphics, or both text and graphics, and wherein each of the layers are individually and sequentially formed with a three dimensional printing apparatus in communication with a computer assist device.

Also disclosed is a process for the preparation of identifying media wherein a three dimensional printing apparatus deposits the layers in a sequence of a first backing layer, a second adhesive layer in contact with the backing layer, a third face stock and a fourth layer of text, graphics, or both text and graphics, or wherein a three dimensional printing apparatus deposits the layers in a sequence of the text, graphics, or both text and graphics layer, the face stock layer, the adhesive layer, and the backing layer.

Yet further disclosed is a process for the preparation of a label comprising the generation of a backing layer, an optional adhesive layer in contact with the backing layer, a face stock layer, a layer of text, graphics, or both text and graphics, and an optional protective top layer, and wherein each of the layers are individually and sequentially formed with a three dimensional printing apparatus that receives directions from a computer assist device.

Moreover, disclosed is a process for the preparation of a label comprising the generation of a backing layer, an adhesive layer in contact with the backing layer, a face stock layer, a layer of text, graphics, or both text and graphics, and an optional protective top layer, wherein a three dimensional printing apparatus deposits the layers in a sequence of the backing layer, the adhesive layer, the face stock layer, the text, graphics, or both a text and graphics layer and the protective layer, or wherein a three dimensional printing apparatus deposits the layers in a sequence of the protective layer, text, graphics, or both text and graphics layer, the face stock layer, the adhesive layer and the backing layer.

Disclosed is a process for the preparation of identifying media comprising the generation of a backing layer, an adhesive layer in contact with the backing layer, a face stock layer, a layer of text, graphics, or both text and graphics, and wherein each of the layers are individually and sequentially formed with a three dimensional printing apparatus in communication with a computer assist device or computer assist member which controls the deposition of the layers in sequence on a supporting platform, and wherein there results the identifying media that is subsequently separated from the platform, and wherein the computer assist member controls the deposition time of each layer, the thickness of each layer, and the material for each layer.

Further, disclosed is a process for the preparation of decals comprising fabrication of a backing layer, a release layer in contact with the backing layer, an adhesive layer in contact with the release layer, a face stock layer in contact with the adhesive layer, and a layer of text, graphics, or both text and graphics, and wherein each of the layers are individually and sequentially formed with a three dimensional printing apparatus in communication with a computer assist device.

FIGURES

The following Figures are provided to further illustrate the identifying media disclosed herein and processes thereof.

EMBODIMENTS

Figure 1:
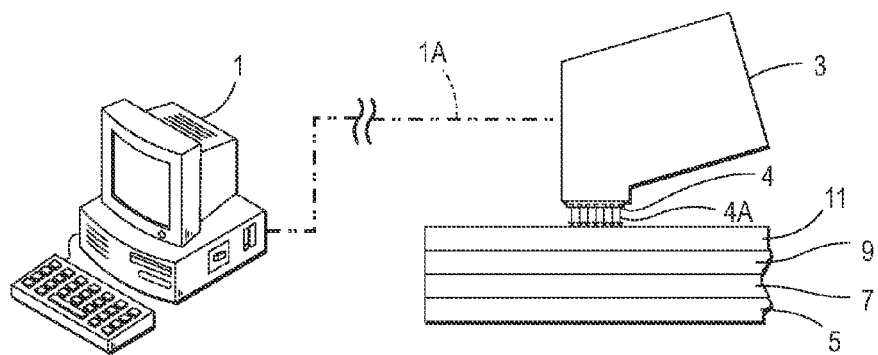
FIG. 1 illustrates an exemplary embodiment of a layered identifying media of the present disclosure.

The terms "including", "includes", "having", "has", "with", or variants thereof are intended to be inclusive in a manner similar to the term "comprising". The term "at least one of" means, for example, one or more of the listed items can be selected.

Any disclosed numerical value, however, inherently contains certain errors necessarily resulting from the standard deviation found in their respective testing measurements. Moreover, all ranges disclosed herein are to be understood to encompass any and all sub-ranges subsumed therein. For example, a range of from about 1 to about 10 can include any and all sub-ranges there between such as 2, 3, 4, 5, 6, 7, 8, 9, and 10, and can include ranges below 1 and ranges above 10.

Known suitable labels, also referred to as peel and stick labels and decals and the components thereof, are encompassed by the processes of the present disclosure. Generally, with respect to the present disclosure a label, includes labels throughout, means a layered structure comprised of a number of layers in differing sequences, such as for example, at least from one to about four or more layers and in sequence in some manufacturing applications, a bottom layer, or liner, an adhesive layer, a layer thereover referred to as the face stock layer, a layer containing patterns, text, graphics, or mixtures thereof and an optional protective layer. The application sequence of layers can be altered, such as for example, by initially applying the protective layer, then applying the layer containing patterns, text, and/or graphics, the face stock layer, the adhesive layer, and the bottom or backing layer. Also, the disclosed labels can include less than four layers where, for example, there is an absence of an adhesive layer, and where the label inherently sticks to the types of objects for which they are intended for. Further, for the disclosed labels in embodiments thereof the minimum number of layers is about two comprised of the label itself and an adhesive layer, however, in this situation there is no protective layer present on the adhesive layer, thus the adhesive layer may not be free of contamination.

Decal includes decals throughout, means a plastic, cloth, paper or ceramic substrate that has printed on it a pattern, or an image, and more specifically text, graphics, or text and graphics. More specifically, decals encompassed by the disclosed processes means a multilayered structure comprised of layers in sequence and in some manufacturing applications of a paper or film liner bottom layer, a release coating layer, an adhesive layer, a layer or film face stock, and a layer containing patterns, images, and/or text which are formed on the upper side of the face stock. In decal manufacturing applications, the sequence deposition of the layers could be reversed similar to the situation with labels, with the pattern, text, and/or image layer being initially generated, followed by the deposition of the film face stock layer, the adhesive layer, the release coating and the bottom layer. In some instances where the film face stock is transparent, a number, such as two patterns, text, and/or image layers may be produced, one on top of the film face stock layer and one on the bottom of the film face stock layer.

Further, in embodiments the disclosed decals may be comprised of a minimum number of layers, such as two layers, the label part being attached to a surface and an adhesive layer to secure the label, however, with for example, water slide decals they should include a backing media and a release layer to more efficiently permit decal slide off characteristics.

In FIG. 1 there is illustrated an identifying media and processes thereof where 1 represents a computer or computer assist device connected by 1A, to 3, a known 3D printer, with openings therein 4, allowing materials, such as polymers 4A, to separately deposit and form a back side layer, layer 5, an adhesive layer 7, in contact with the backing layer, a face stock layer 9, and a layer 11 of text, graphics, or both text and graphics.

Figure 2:
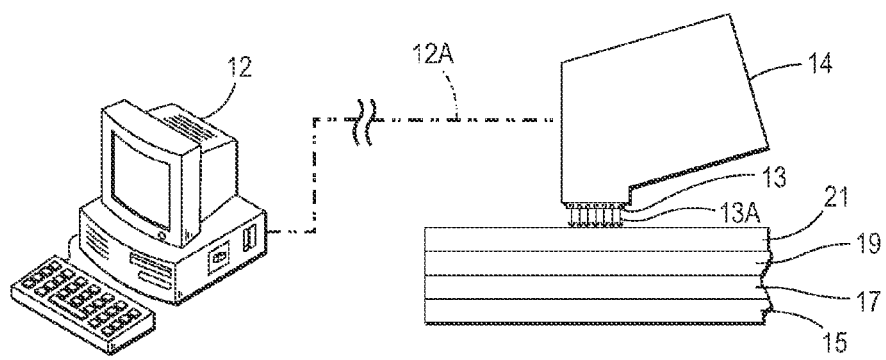
FIG. 2 illustrates an exemplary embodiment of a layered identifying media of the present disclosure.

In FIG. 2 there is illustrated an identifying media and processes thereof where 12 represents a computer or computer assist device connected by 12A to 14, a known 3D printer, with openings therein 13, allowing materials, such as polymers 13A, to separately deposit and form in sequence a text, graphics, or both text and graphics layer 15, a face stock layer 17, an adhesive layer 19, and a backing layer 21.

Figure 3:
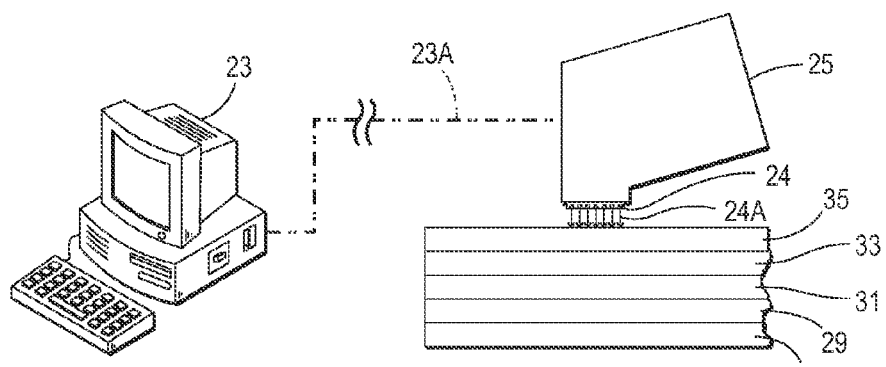
FIG. 3 illustrates an exemplary embodiment of layered identifying media of the present disclosure.

In FIG. 3 there is illustrated an identifying media and processes thereof where 23 represents a computer connected by 23A to a 3D printer 25 with openings 24, and where materials like polymers 24A are separately deposited and form in sequence a back side layer, layer 27, an adhesive layer, layer 29, in contact with the backing layer, a face stock layer 31, a layer 33, of text, graphics, or both text and graphics, and an optional protective layer 35.

Figure 4:
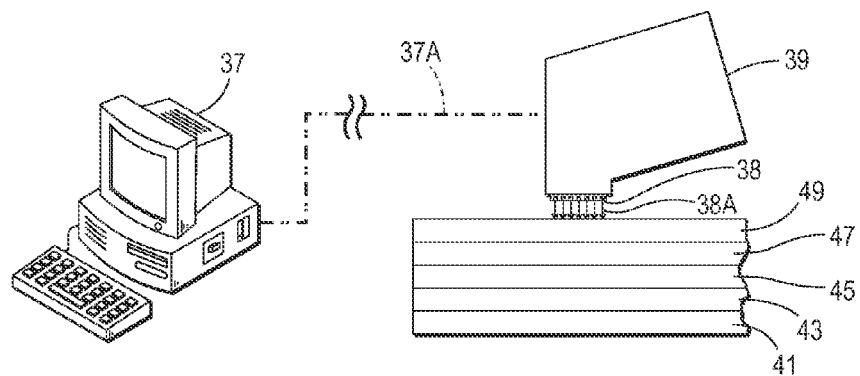
FIG. 4 illustrates an exemplary embodiment of layered identifying media of the present disclosure.

In FIG. 4 there is illustrated a label and processes thereof where 37 represents a computer connected by 37A to a 3D printer 39 with openings 38, and where materials like polymers 38A are separately deposited to form a first backside layer 41, an optional adhesive layer 43 in contact with the backside layer 41, a face stock layer 45, a layer 47 of text, graphics, or text and graphics, and an optional protective layer 49.

Figure 5:
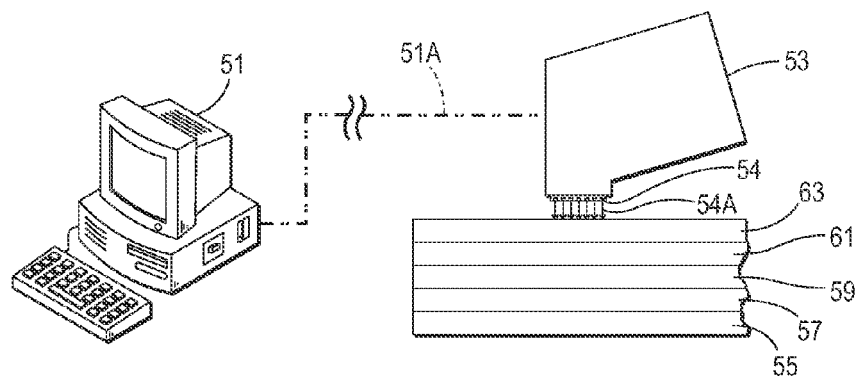
FIG. 5 illustrates an exemplary embodiment of layered identifying media of the present disclosure.

In FIG. 5 there is illustrated a decal and processes of preparation thereof where 51 represents a computer connected by 51A to 53, a 3D printer, with openings 54 therein, and where materials 54A are separately deposited and form in sequence a backside layer 55, followed by a release layer 57, then an adhesive layer 59, a face stock layer 61, and a final text, graphics, or text and graphics layer 63.

Figure 6:
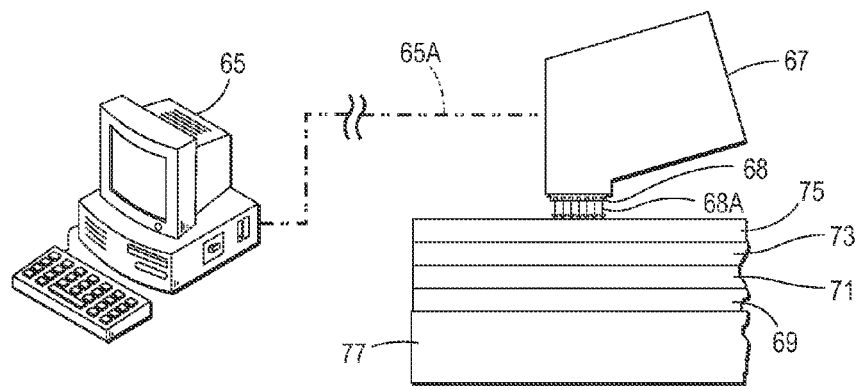
FIG. 6 illustrates an exemplary embodiment of layered identifying media of the present disclosure.

In FIG. 6 there is illustrated a label and processes thereof where 65 represents a computer connected by 65A to a 3D printer 67, with openings therein 68, and where materials 68A are deposited on a supporting substrate, such as a platform 77, in the sequence of a backside layer 69, followed by an adhesive layer 71, then a face stock layer 73, and a final layer of text, graphics, or text and graphics 75, and where the generated label is removed from the platform.

Figure 7:
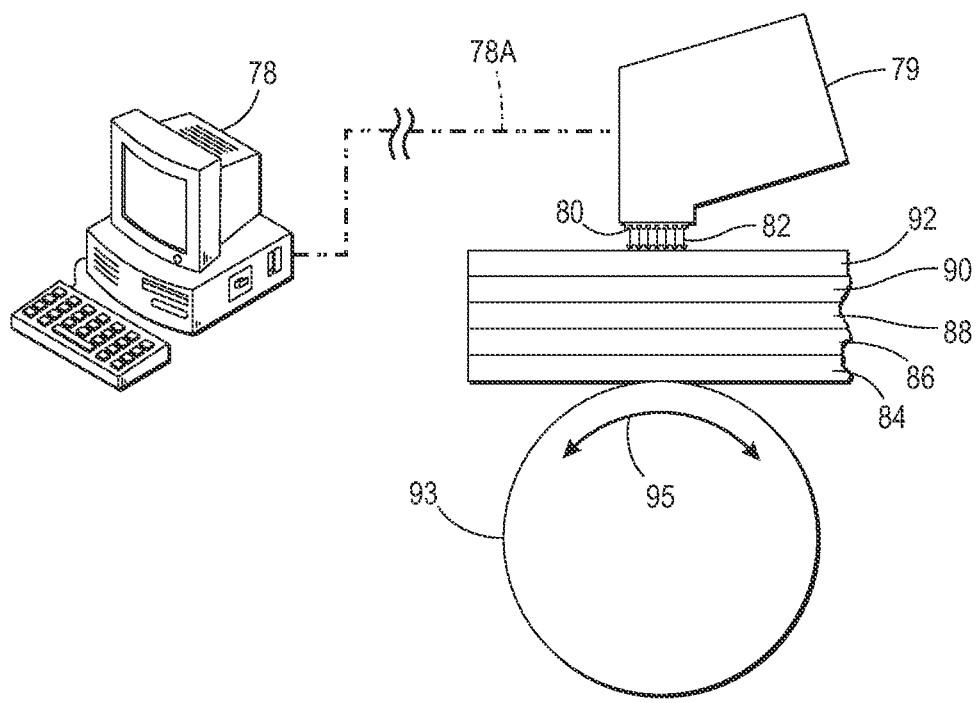
FIG. 7 illustrates an exemplary embodiment of layered identifying media of the present disclosure.

In FIG. 7 there is illustrated an identifying media and processes thereof where 78 represents a computer assist device connected by 78A to a 3D printer 79, with openings therein 80, and where materials 82 are individually deposited to form in sequence a first backside layer 84, then an adhesive layer 86, a face stock layer 88, a text, graphics, or text and graphics layer 90, and a final optional protective layer 92, and where each of the layers 84 to 92 are deposited on a rotating supporting substrate platform 93 moving in the direct of the arrows 95, that is either a clockwise or counterclockwise direction.

Three Dimensional (3-D) Printing

Disclosed are processes for the preparation of, or the fabrication of identifying media, such as labels, decals and tags, consumer goods, identification tags, bar codes, auto stickers, liquor containers, advertising information, and other similar media, and where three-dimensional printing is selected. Generally, with respect to the disclosed processes 3-D printing, inclusive of additive printing, a solid, three-dimensional object, can be constructed by adding a sequence of materials in layers, and where the material selected can usually be sprayed, squeezed, jetted or otherwise transferred from the printer onto a building platform.

The 3-D printing devices selected for the processes of the present disclosure include known devices and apparatuses such as those described in U.S. Pat. Nos. 7,291,002; 7,589,868; 8,142,860; 8,155,774, and 8,366,432, the disclosures of each of these patents being totally incorporated herein by reference.

Examples of specific three dimensional printing devices utilized for the disclosed processes are available from a number of sources, such as 3D Systems and Stratasys. In these available devices, there can be prepared certain three-dimensional objects from a representation of the object stored in memory, and where the device can include a rotary build table for receiving successive layers of a build material, such as a polymer, and an array having at least one printhead disposed above the build table. Further, these available devices can include a circular build table for receiving successive layers of a build material and an array having at least one printhead disposed above the build table and movable relative to the build table, and where the circular build table is movable in a vertical direction, the printhead is movable over at least a portion of a build surface defined by the generally circular build table, and where the printhead can move continuously about the build table.

In another 3-D device, there is accomplished the deposition of successive layers of a build material on a rotary build table and depositing a liquid or polymer in a predetermined pattern on each successive layer of the build material to form the three-dimensional object. This method includes rotating the build table continuously, distributing the build material over at least a portion of the build table with a spreader, measuring the amount of excess build material that is deposited on the build table, and adjusting the amount of build material deposited on the build table based on the amount of excess build material measured. Additionally, the liquid, polymer, or other materials can be deposited by an array of one or more printheads.

In a disclosed 3-D printing initial first stage, there is prepared an object's design like a label or decal with the specifications desired. The label, decal, or other identifying media specifications can be created by a user with computer aided design (CAD) sites.

More specifically, with computer aided design (CAD) or modeling software there can be created a design of an object, such as the label and decals illustrated herein, and where the software allows one to create a virtual blueprint of the object to be printed. The software then divides the object into digital cross-sections so the printer can build the object in a layer by layer sequence, and where the cross-sections essentially function as guides for the printer to enable an object of certain specifications, such as the exact size and shape contemplated.

Thereafter, the 3-D printer is activated to initiate a series of passes, much like an inkjet printer, over the platform to deposit a plurality of separate layers, such as one layer of material on top of another layer of the same or another material to create the finished label or decal product.

Also, 3-D printing in accordance with the present disclosure comprises a method of creating three-dimensional objects by depositing or forming thin layers of materials, such as polymers and adhesive layers, for the disclosed preparation of labels and decals in succession to form and additively build up a selected 3-D structure, referred to for example, as rapid prototyping and manufacturing. These processes have some similarities to normal ink jet printing in that a digital representation of an object to be formed is used, and each layer is formed as if it were one layer of printing by moving a printing head over the support device or a work piece, and activating elements of the printing head to thus create the printed three dimensional objects.

A further 3-D device for preparing and manufacturing the disclosed three-dimensional labels, decals, and other similar identifying media is by the deposition of a number of layers of a building material in a solid form. This type of device can comprise, for example, a machine frame and a building space that is arranged in the machine frame. In the building space, there is arranged an application device that applies layers of the building material onto a support device and a previously applied layer, respectively, by an application element and a materials supply device that provides building materials to the application device.

Processes

The disclosed processes comprise the generation and fabrication of an identification media and objects like a label or a decal utilizing a computer program or a computer assisted device (CAD) that includes preselected software. The CAD, which is in communication with or connected to the 3-D printer, that contains or has access to the materials to be deposited, such as polymers, paper, and the like, is activated to generate specific individual layers of a backing layer, an adhesive layer, a face stock layer, and a layer that includes text, graphics, or a mixture of text and graphics. In embodiments, there may be formed two layers in contact with an adhesive layer, such as a layer of the text and then a separate layer of graphics. Following the drying of the product resulting with a number of preselected layers, there is formed the labels and decals. This process is then rapidly continuously repeated to form numerous labels and decals that are in a form for affixing to a number of sources as those illustrated herein like consumer goods, such as foods, liquids, meats, bread, and other supermarket goods; conveying messages to the public for stores, automobiles, gasoline service stations, luggage, electronic devices, computers, cartons, packages, maps, signs, books, toys, appliances, office equipment, office supplies, furniture, bar codes, bottles, such as liquor and wine bottles, and the like.

Layers

For the disclosed label, decal and a number of other identifying media, the backing layer, also referred to as the bottom layer, can be comprised of a number of various materials, such as paper, plastics, polymers, and the like. Therefore, the backing layer can include, for example, suitable paper products, thermoplastic polymers, thermosetting polymers, or mixtures of polymers. Specific examples of polymers selected for the backing layer are polyesters, polyurethanes, polyimides, polysulfones, polyamides, polyalkylenes, such as polypropylene and polyethylene, polyvinyl chlorides, polystyrenes, other known suitable polymers and mixtures thereof. The backing layer varies in thickness depending, for example, on the materials present and the type of label or decal involved. The thickness of this layer can be, for example, from about 95 to about 300 microns, from about 95 to about 230 microns, from about 97 to about 230 microns, from about 150 to about 200 microns, or from about from about 125 to about 175 microns. Thicknesses outside the ranges disclosed may also be selected for the backing layer.

The adhesive layer, when present, can be comprised of known adhesives that, when applied to the surfaces of materials, binds the surfaces together and resists separation. The term adhesive may sometimes be used interchangeably with glue, cement and paste. Examples of adhesives selected for this layer are acrylics, epoxies, silicones, polyurethanes, cyanoacrylates, mixtures thereof, and the like. A number of suitable specific adhesives that can be selected for the labels and decals disclosed herein are available from 3M, inclusive of for example, 300 high strength acrylics. The thickness of the adhesive layer can vary depending, for example, on the layers that are being attached and the composition of the adhesives thereof. Generally, the adhesive layer thickness is, for example, from about 10 to about 25 microns, from about 12 to about 20 microns, or from about 14 to about 18 microns, however, thicknesses outside these ranges may also be selected for this layer.

The peel and stick, or face stock layer, which remains after use of the disclosed labels and decals, can be comprised of a number of known materials, such as the polymers selected for the backing layer, inclusive of polyesters, polyurethanes, polyvinylchlorides, polyimides, polystyrenes, polyalkylenes, mixtures thereof, and the like. This layer can vary in thicknesses depending, for example, on the components and compositions selected for the other layers and the intended uses thereof. Generally, this layer is of a thickness of, for example, from about 25 to about 75 microns, from about 35 to about 60 microns, and from about 45 to about 50 microns, however, thicknesses outside these ranges may also be selected for this layer.

For the layer containing text, graphics, or both text and graphics, it can be comprised of various colorants and pigments depending on the outputs desired. Thus, this layer can include black colorants, such as carbon blacks, white colorants such as titanium oxides, magenta colorants, yellow colorants, cyan colorants, yellow colorants, green colorants, orange colorants, tan colorants, and other colorants, and pigments of the known Pantone series of colorants and pigments, available from Pantone, Incorporated and those colorants available from Mmcor Technologies Incorporated, especially those identified as mcor iris true colors for 3-D printing. The thickness of this layer can vary depending, for example, on the colorants or mixtures thereof selected, however, generally the thickness of this layer is, for example, from about 5 to about 15 microns, from about 7 to about 12 microns, or from about 8 to about 10 microns. Thicknesses outside the ranges disclosed may also be selected for the layer containing text, graphics, or both text and graphics.

The optional protective overcoat layer can comprise the polymers illustrated herein, such as polyesters, polystyrenes, acrylics, polyvinylchlorides, polyalkylenes, mixtures thereof, and the like. This layer can be of various suitable thicknesses, such as for example, from about 10 to about 250 microns, from about 10 to about 230 microns, from about 75 to about 250 microns, or from about 100 to about 175 microns.

The disclosed decals of plastics, cloth, or paper can contain the same layers as the label layers described herein with the primary exception that the decals usually include a release layer coating situated between the backing layer and the adhesive layer. Examples of release coating layers, that include those substances that will aid in the separation of, for example, the backing layer from the other layers present are silicones, acrylics, mixtures thereof, and the like. For the release coating layer, it can be of various thicknesses depending, for example, on the materials selected; generally, however, this layer is, for example, of a thickness of from about 10 to about 25 microns, from about 12 to about 20 microns, from about 14 to about 18 microns, or from about 15 to about 17 microns. Thicknesses outside the ranges disclosed may also be selected for the release coating layer.

With further regard to the decal layer, a thin plastic decal known, for example, as cellophane, which in some situations may be transparent, can be comprised of a backing layer, a release coating layer, an adhesive layer, a film stock layer and the text, graphics, or a mixture of text and graphics layer, the thickness of this layer being, for example, from about 10 to about 15 microns or from about 12 to about 12.5 microns. Examples of the release coatings include silicones, fluoropolymers available from E.I. DuPont Chemicals, a number of other known release materials.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A process for the preparation of identifying media comprising the generation of a backing layer, an adhesive layer in contact with the backing layer, a face stock layer, a layer of text, graphics, or both text and graphics and wherein each of said layers are individually formed with a three dimensional printing apparatus in communication with a computer assist device.

2. A process in accordance with claim 1 wherein there is included as a separate layer, in contact with the text, graphics or text and graphics layer, a protective layer of a thickness of from about 10 to about 230 microns.

3. A process in accordance with claim 1 wherein the three dimensional printing apparatus deposits on a supporting substrate, the layers in sequence of a first backing layer, a second adhesive layer in contact with the backing layer, a third face stock layer and a fourth layer of text, graphics or both text and graphics.

4. A process in accordance with claim 1 wherein the three dimensional printing apparatus deposits the layers in a sequence of the text, graphics, or both text and graphics layer, the face stock layer, the adhesive layer and the backing layer.

5. A process in accordance with claim 1 wherein the identifying media is a label.

6. A process in accordance with claim 1 wherein the identifying media is a decal.

7. A process in accordance with claim 1 wherein the backing layer is comprised of thermoplastic polymers or thermosetting polymers and wherein this layer is of a thickness from about 95 to about 230 microns.

8. A process in accordance with claim 1 wherein the backing layer is selected from the group consisting of polyesters, polyurethanes, polyimides, polyamides, polyalkylenes, polyvinyl chlorides and polystyrenes.

9. A process in accordance with claim 8 wherein said backing layer is a polyester.

10. A process in accordance with claim 1 wherein said adhesive layer is selected from the group consisting of acrylics, epoxies, silicones, polyurethanes, cyanoacrylates and mixtures thereof.

11. A process in accordance with claim 10 wherein the adhesive layer is an acrylic polymer of a thickness of from about 12 to about 20 microns.

12. A process in accordance with claim 1 wherein the face stock layer is selected from the group consisting of polyesters, polyurethanes, polyimides, polyamides, polyalkylenes, polyvinyl chlorides and polystyrenes and wherein the optional thickness of the face stock layer is from about 25 to about 75 microns.

13. A process in accordance with claim 1 wherein said layer of text, graphics, or text and graphics is comprised of colorants.

14. A process in accordance with claim 13 wherein the colorants are black, white, or mixtures thereof.

15. A process in accordance with claim 13 wherein the colorants are selected from the group consisting of black, cyan, magenta, yellow, green, orange, tan and mixtures thereof and optionally wherein said layer is of a thickness from about 5 to about 15 microns.

16. A process in accordance with claim 1 wherein said computer assist member controls the deposition of said layers in sequence on a supporting platform, and wherein there results said identifying media that is subsequently separated from said platform, and wherein said computer assist member controls the deposition time of each layer, the thickness of each layer, and the material for each layer.

17. A process in accordance with claim 1 further including a polymer protective overcoat layer with an optional thickness of from about 10 to about 250 microns.

18. A process for the preparation of a label comprising the generation, on a supporting substrate, of a backing layer, an optional adhesive layer in contact with the backing layer, a face stock layer, a layer of text, graphics, or both text and graphics, and an optional protective top layer, and wherein each of said layers are individually and sequentially formed with a three dimensional printing apparatus that receives directions from a computer assist device.

19. A process in accordance with claim 18 wherein the adhesive layer is present and wherein both text and graphics are present.

20. A process in accordance with claim 18 wherein the adhesive layer is present, the protective layer is present, and wherein the three dimensional printing apparatus deposits the layers in a sequence of the backing layer, the adhesive layer, the face stock layer, the text, graphics, or both a text and graphics layer and the protective layer, or wherein the three dimensional printing apparatus deposits the layers in a sequence of the protective layer, text, graphics, or both text and graphics layer, the face stock layer, the adhesive layer and the backing layer, and wherein said deposits are accomplished on said supporting substrate.

21. A process in accordance with claim 18 wherein the backing layer is comprised of a polymer, the adhesive layer is comprised of an acrylic polymer, the face stock layer is comprised of a polymer, and there is present both texts and graphics.

22. A process for the preparation of decals comprising the fabrication of a backing layer, a release layer in contact with the backing layer, an adhesive layer in contact with the release layer, a face stock layer in contact with the adhesive layer, and a layer of text, graphics, or both text and graphics and wherein each of said layers are individually and sequentially formed with a three dimensional printing apparatus in communication with a computer assist device.

23. A process in accordance with claim 22 wherein the text, graphics, or both text and graphics are comprised of colorants selected from the group consisting of black, cyan, magenta, yellow, orange, green, tan and mixtures thereof, and wherein each layer is deposited on a supporting substrate.

* * * * *